Patented June 25, 1935

2,005,997

UNITED STATES PATENT OFFICE 2,005,997

PRODUCTION OF MIXED FERTILIZERS

Carl Krauch and Carl Eyer, Ludwigshafen-on-the-Rhine, Gottwald Baetz, Oggersheim, and Friedrich Korn, Ludwigshafen-on-the-Rhine, Germany, assignors to I. G. Farbenindustrie Aktiengesellschaft, Frankfort-on-the-Main, Germany No Drawing. Application March 9, 1931, Serial No. 521,253. In Germany June 5, 1928

22 Claims. (Cl. 71—9)

The present invention relates to improvements in the production of mixed fertilizers containing ammonium nitrate.

The production of mixed fertilizers containing ammonium nitrate is well known in the art. Most of these fertilizers are prepared by mixing the components in the dry state. It has also been proposed to introduce the desired other components of the mixed fertilizers into melts or highly concentrated solutions of ammonium nitrate and then to solidify the mixtures for example by spraying. In this operation, however, great difficulties are experienced in practice because the melts are rather viscous, especially if they contain calcium carbonate, and can only be obtained by the application of comparatively high temperatures. Further, such melts tend to form products which are not sufficiently stable to mechanical influences such as attrition and which therefore give rise to difficulties in storage and application.

We have now found that the aforesaid objections can be easily overcome by adding to the melts prior to spraying small quantities of sodium salts soluble therein. Sodium salts suitable for this purpose are for example sodium nitrate, sodium sulphate, sodium chloride and sodium phosphates. Of course the sodium salts thus added must not be injurious to the plants, but preferably should have a fertilizing action themselves. The said sodium salts are used in small quantities up to 10 per cent by weight of the melts. As a rule comparatively small amounts, for example about 6 per cent and even less, say from 3 to 6 per cent, are sufficient. For example the addition of about 5 per cent of Chile saltpetre to a mixed fertilizer containing ammonium nitrate and ammonium sulphate has proved very advantageous.

The melts prepared in accordance with the present invention have the advantage that they possess a comparatively low viscosity and therefore can easily be sprayed. When effecting spraying by means of a rotating body, the drops formed solidify with the formation of globular granules of great hardness which are very insensitive against attrition and other mechanical wear occurring in shipping the fertilizers. Further, the products do not tend to cake.

The following examples will further illustrate the nature of the present invention which, however, is not restricted to these examples.

Example 1

125 kilograms of sodium nitrate, for example Chile saltpetre and 1500 kilograms of ammonium sulphate are slowly introduced into 1000 kilograms of a melt of ammonium nitrate which contains 8 percent of water, at from 135° to 140° C. The liquid melt is then spurted at about 135° C. from a rotating body. The granules of the salt obtained have smooth globular surfaces and are characterized by a firm structure; they are more resistant to comminution than a product prepared without the said addition of sodium nitrate. The salt has a nitrogen content of about 26 per cent.

An ammonium nitrate melt having a higher concentration may be employed equally well, but in this case the temperature must be correspondingly increased. For example a 97 per cent ammonium nitrate melt is heated to between 150° and 160° C. When employing ammonium nitrate melts with a rather high content of water, a subsequent drying of the solidified product is preferable.

Instead of sodium nitrate, other sodium salts, as for example sodium sulphate may be used in a similar manner. For example, when spraying a melt consisting of 1250 parts of ammonium nitrate, 62.5 parts of water, 1500 parts of ammonium sulphate and 100 parts of anhydrous sodium sulphate, at about 130° C., solid, globular granules having a smooth surface are obtained on solidification.

Example 2

75 kilograms of sodium nitrate are dissolved in 1000 kilograms of an ammonium nitrate melt containing 8 per cent of water, and 575 kilograms of finely divided calcium carbonate are then introduced at between 100° and 110° C. The melt can easily be sprayed at between 100° and 105° C. and yields globular granules containing about 21 per cent of nitrogen. It is advantageous to subject the resulting product to a drying treatment by heating it for some time to about 100° C.

Example 3

107 kilograms of secondary sodium phosphate and thereafter 920 kilograms of potassium sulphate are introduced at about 130° C. into 1000 kilograms of an ammonium nitrate melt of 95 per cent strength. The resulting melt is comminuted to droplets at the same temperature by means of a centrifuge, and the said droplets solidify to uniform globular granules.

Example 4

About 60 kilograms of common salt are dissolved at about 145° C. in 1300 kilograms of an ammonium nitrate melt containing 4 per cent of water. 1500 kilograms of finely ground ammonium sulphate are then introduced into the mixture while heating, so that the temperature of the melt remains at 145° C. until all ammonium sulphate has been introduced. The melt is then sprayed at the said temperature and solidifies to uniform globular granules.

This application is a continuation-in-part application of our copending application Ser. No. 360,614, filed May 4th, 1929.

What we claim is:—

1. Process of producing globular granules of a mixed fertilizer resistant to attrition, containing ammonium nitrate as a major constituent which comprises adding to a melt containing ammonium nitrate and at least one other fertilizing salt up to 10 per cent by weight of the melt of a sodium salt soluble therein and non-injurious to plants, and then solidifying the resulting melt by spraying.

2. Process of producing globular granules of a mixed fertilizer resistant to attrition, containing ammonium nitrate as a major constituent which comprises adding to a melt containing ammonium nitrate and at least one other fertilizing salt up to 10 per cent by weight of the melt of sodium nitrate, and then solidifying the resulting melt by spraying.

3. Process of producing globular granules of a mixed fertilizer resistant to attrition, containing ammonium nitrate as a major constituent which comprises adding to a melt containing ammonium nitrate and ammonium sulphate up to 10 per cent by weight of the melt of a sodium salt soluble therein and non-injurious to plants, and then solidifying the resulting melt by spraying.

4. Process of producing globular granules of a mixed fertilizer resistant to attrition, containtrate in the resulting melt being equal to at least one-third the weight of the melt, and then solidifying the resulting melt by spraying.

8. A mixed fertilizer in globular granules resistant to attrition comprising ammonium nitrate as a major constituent, at least one other fertilizing salt, and containing in addition thereto up to 10 percent by weight of a sodium salt which is soluble in a melt of said mixed fertilizer and which is non-injurious to plants.

9. A mixed fertilizer in globular granules resistant to attrition comprising ammonium nitrate, as a major constituent, at least one other fertilizing salt, and containing in addition thereto up to 10 per cent by weight of sodium nitrate.

10. A mixed fertilizer in globular granules resistant to attrition containing ammonium nitrate as a major constituent, and ammonium sulphate, and containing in addition thereto up to 10 per cent by weight of a sodium salt which is soluble in a melt of said mixed fertilizer and which is non-injurious to plants.

11. A mixed fertilizer in globular granules resistant to attrition containing ammonium nitrate as a major constituent, and ammonium sulphate, and containing in addition thereto up to 10 per cent by weight of sodium nitrate.

12. A mixed fertilizer in globular granules resistant to attrition containing an essential amount of ammonium nitrate, at least one other fertilizing salt, and containing in addition thereto up to 10 percent by weight of a sodium salt having a strong mineral acid anion, the quantity of ammonium nitrate being equal to at least one-third of the total weight.

13. A mixed fertilizer in globular granules resistant to attrition containing an essential amount of ammonium nitrate, and ammonium sulphate, and containing in addition thereto from 3 to 10 percent of the total weight of a sodium a mixed fertilizer resistant to attrition containing ammonium nitrate as a major constituent, which comprises adding to a melt containing ammonium nitrate and calcium carbonate up to 10 per cent by weight of the melt of sodium nitrate, and then solidifying the resulting melt by spraying.

19. A mixed fertilizer in globular granules resistant to attrition comprising ammonium nitrate as a major constituent, at least one other fertilizing salt, and containing in addition thereto up to 10 percent by weight of sodium sulphate.

20. A mixed fertilizer in globular granules resistant to attrition containing ammonium nitrate as a major constituent, and ammonium sulphate, and containing in addition thereto up to 10 per cent by weight of sodium sulphate.

21. A mixed fertilizer in globular granules resistant to attrition comprising ammonium nitrate as a major constituent, and calcium carbonate, and containing in addition thereto up to 10 per cent by weight of a sodium salt which is soluble in a melt of said mixed fertilizer and which is non-injurious to plants.

22. A mixed fertilizer in globular granules resistant to attrition comprising ammonium nitrate as a major constituent and calcium carbonate, and containing in addition thereto up to 10 per cent by weight of sodium nitrate.

CARL KRAUCH.
CARL EYER.
GOTTWALD BAETZ.
FRIEDRICH KORN.